United States Patent [19]
Narayanan et al.

[11] 3,929,814
[45] Dec. 30, 1975

[54] (OXADIAZOLYL) ALKYL) BENZIMIDAZOLES

[75] Inventors: Venkatachala L. Narayanan, Hightstown; Rudiger D. Haugwitz, Titusville, both of N.J.

[73] Assignee: E. R. Squibb & Sons, Inc., Princeton, N.J.

[22] Filed: Apr. 1, 1974

[21] Appl. No.: 456,707

[52] U.S. Cl. ..... 260/302 H; 260/307 G; 260/309.2; 424/270; 424/272
[51] Int. Cl.² ........................................ C07D 271/06
[58] Field of Search ................. 260/302 H, 307 G

[56] References Cited
UNITED STATES PATENTS
3,478,046  11/1969  Sarett et al. ................... 260/302 H Primary Examiner—Raymond V. Rush
Attorney, Agent, or Firm—Lawrence S. Levinson; Merle J. Smith; Donald J. Barrack

[57] ABSTRACT

Compounds of [(oxadiazolyl)alkyl] the structure

I

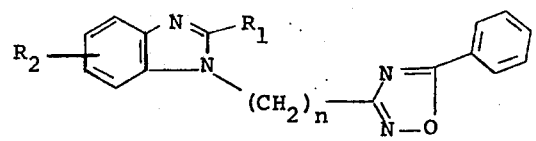

wherein $R_1$ is hydrogen or thiazolyl, $R_2$ is hydrogen, alkyl, alkoxy, phenyl, nitro, amino, chlorine, bromine, trifluoromethyl, or isothiocyano, and n is 2 to 6, and their pharmaceutically acceptable acid-addition salts, are useful anthelmintic agents.

7 Claims, No Drawings

(OXADIAZOLYL) ALKYL) BENZIMIDAZOLES

SUMMARY OF THE INVENTION

Compounds having the structure

I

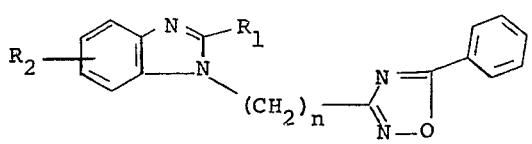

and the pharmaceutically acceptable acid-addition salts thereof, are useful as anthelmintic agents. In formula I, and throughout the specification, the symbols are as defined below:

$R_1$ can be hydrogen or thiazolyl;
$R_2$ can be hydrogen, alkyl, alkoxy, phenyl, nitro, amino, chlorine, bromine, trifluoromethyl, or isothiocyano; and
$n$ can be an integer of from 2 to 6.

The term "alkyl" as used throughout the specification refers to straight or branched chain alkyl groups having 1 to 6 carbon atoms; alkyl groups of 1 to 3 carbon atoms are preferred.

The term "alkoxy" as used throughout the specification refers to groups of the formula Y-O- wherein Y is alkyl as defined above.

DETAILED DESCRIPTION OF THE INVENTION

[(Oxadiazolyl)alkyl]benzimidazoles of formula I, and their pharmaceutically acceptable acid-addition salts, are useful for the treatment of mammals infected with helminths, e.g., species of Haemonchus, Ostertagia, Trichostrongylus, Cooperia, Nematodirus, Bunostomum, Strongyloides, Oesophagostomum, Trichuris, and Moniezia. Helminthiasis causes widespread and often serious infection in mammals such as sheep, swine, cattle, horses, goats, etc. In treating animals infected with parasites, the [(oxadiazolyl)alkyl]benzimidazoles of this invention can be mixed with a pharmaceutically acceptable carrier to form a feed supplement which can be incorporated in the animal feed in the desired concentration.

The preferred dosage level for treating a helminth infection will depend to a large extent on the particular [(oxadiazolyl)alkyl]benzimidazole compound being employed, on the severity of the infection and on the particular species of animal to be treated. In general, the compounds of this invention exhibit anthelmintic activity when administered to animals in a daily dose of about 50 to about 300 milligrams per kilogram of animal body weight. It is preferred to employ them in the range of 100 to 200 milligrams per kilogram of body weight per day. The compounds may be given in a single dose or divided into a plurality of smaller doses. If desired, the course of treatment may be extended over a period of days in which case the optimum daily dose level may be lowered.

The compounds of formula I form physiologically acceptable acid-addition salts with inorganic and organic acids, which in addition to having anthelmintic activity, frequently provide useful means for isolating the products from reaction mixtures by forming the salt in a medium in which it is insoluble. The free base may then be obtained by neutralization, e.g., with a base such as sodium hydroxide. Other salts may then be formed from the free base and the appropriate organic or inorganic acid. Illustrative are the hydrohalides, especially the hydrochloride and hydrobromide which are preferred, sulfate, nitrate, phosphate, tartrate, maleate, fumarate, citrate, succinate, methanesulfonate, benzenesulfonate, toluenesulfonate and the like.

Compounds of formula I wherein $R_2$ is other than amino or isothiocyano can be prepared from the corresponding benzimidazole having the formula II 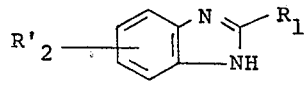

wherein $R'_2$ can be hydrogen, alkyl, alkoxy, phenyl, nitro, chlorine, bromine, or trifluoromethyl. Benzimidazoles of formula II are well known in the art; see, for example, Weissberger's *The Chemistry of Heterocyclic Compounds, Imidazole and Its Derivatives*, Interscience Publishers, Co., New York, 1953.

Reaction of a benzimidazole of formula II with a haloalkylnitrile of the formula III X-(CH$_2$)$_n$-CN 

wherein X is chlorine or bromine, yields a 1-cyanoalkylbenzimidazole having the formula IV 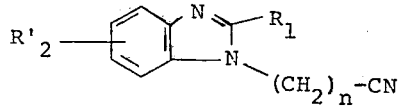

The reaction can be run in an organic solvent such as a lower alkanol, acetone, benzene, glyme, dimethylformamide, etc., in the presence of an organic or inorganic base such as triethylamine, pyridine, sodium or potassium hydroxide, sodium hydride, etc. While the reaction can be run at a temperature of from 10°C to 200°C for 30 minutes to 2 days, it is most conveniently run at room temperature for about 30 minutes to 4 hours.

Alternatively, compounds of formula IV wherein $n$ is 2 can be prepared by reacting a benzimidazole of formula II with acrylonitrile. The reaction can be run in an organic solvent, e.g., dioxane, at a temperature of from 30°C to 150°C, for about 30 minutes to 24 hours. A catalyst such as benzyltrimethylammonium hydroxide is added to the reaction mixture.

Amidoximes having the formula

V 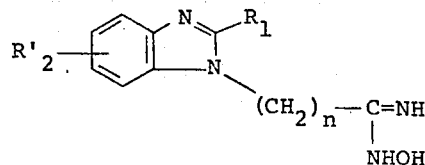

can be prepared from a 1-cyanoalkylbenzimidazole of formula IV. Reaction of a 1-cyanoalkylbenzimidazole of formula IV with hydroxylamine hydrochloride in the presence of sodium or potassium carbonate yields the corresponding amidoxime of formula V. The reaction can be run in a lower alkanol, ethanol is preferred, under reflux conditions for about 6 hours to 48 hours, preferably about 12 hours to 24 hours. [(Oxadiazolyl)alkyl]benzimidazoles for formula I wherein $R_2$ is other than amino or isothiocyano can be prepared by reacting an amidoxime of formula V with benzoyl chloride or benzoic anhydride in the presence of boron trifluoride etherate. The reaction can be run at a temperature of from 10°C to 200°C for about 10 minutes to 24 hours, preferably at about 80°C to 180°C for 30 minutes to 12 hours. The resultant benzimidazole has the formula

VI

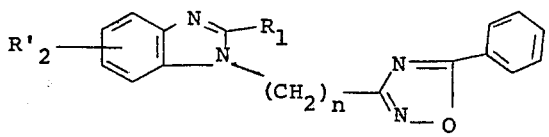

[(Oxadiazolyl)alkyl]benzimidazoles of formula I wherein $R_2$ is amino are prepared from the corresponding compound of formula VI wherein $R'_2$ is nitro. The nitro group can be reduced to an amino group using procedures well known in the art. Exemplary of such procedures is catalytic hydrogenation using, for example, palladium or platinum oxide as the catalyst. The resultant compounds have the formula

VII

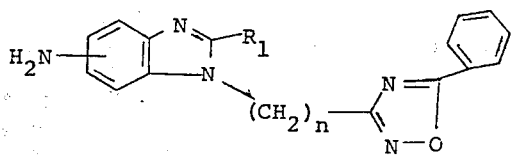

Compounds of formula I wherein $R_2$ is isothiocyano are prepared from the corresponding amino compound of formula VII. The amino compound of formula VII is reacted with a reagent capable of converting an amino group into an isothiocyano group. The reaction is carried out in the presence of a solvent which is inert to the reactants, e.g., aromatic solvents such as benzene or toluene, halogenated hydrocarbons such as chloroform, or ethers such as glyme.

Thus, for example, an amino compound of formula VII can be converted to a compound of formula I wherein $R_2$ is isothiocyano by reacting it with a thiocarbonic acid derivative having the formula

VIII   X-CS-Z wherein X is chlorine or bromine and Z is chlorine, bromine or a dialkylamino group such as diethylamino. Thiophosgene and N,N-diethylthiocarbamoyl chloride are exemplary of the compounds of formula VIII.

When thiophosgene is employed in the above reaction, the reaction is carried out at a temperature in the range of from about 0°C to about 60°C, preferably in the presence of an acid binding agent such as calcium or sodium carbonate, or an amine such as triethylamine. The reaction with thiophosgene is further described in Houben-Weyl's *Methoden Der Organischen Chemie*, 4th Edition, Vol. 9, pages 867 and ff (1955). The use of the acid binding agents is further described by O. E. Schultz in Arch. Pharm. 295, 146–151 (1962).

When N, N-diethylthiocarbamoyl chloride is employed to react with a compound of formula VII, the reaction is carried out at a temperature ranging from about 40°C to about 200°C as described in the procedure set forth in J. Org. Chem. 30, 2465 (1965).

Compounds of formula I wherein $R_2$ is isothiocyano can also be prepared by reacting an amino compound of formula VII with carbon disulfide in the presence of an organic or inorganic base, whereby the amino group is first converted into the corresponding dithiocarbamic salt which is subsequently dehydrosulfurized to the isothiocyano group. The dehydrosulfurization can be performed oxidatively with metal salts (for a further description see British Pat. No. 793,802 and Dutch Pat. No. 81,326), e.g., lead copper, zinc, or ferric salts; with iodine; with alkali metal (preferably sodium or potassium) hypochlorites (for description see Deutsche Auslegungsschrift 1,192,189); or with chloramine T (for a further description see British Pat. No. 1,024,913).

Another method for preparing an isothiocyano compound of formula I comprises reacting an amino compound of formula VII with phosgene and phosphorous pentasulfide according to the procedure set forth in Houben-Weyl, *Methoden Der Organischen Chemie*, 4th Edition, Vol. 9, pages 867 and ff (1955).

Still another method for preparing the isothiocyano compounds of formula I comprises reacting an amino compound of formula VII with ammonium rhodanide and benzoyl chloride to yield the thiourea derivative which may then be thermally decomposed, e.g., in boiling chlorobenzene, to the isothiocyano derivative. A further description of the reaction may be found in Houben-Weyl, *Methoden Der Organischen Chemie*, 4th Edition, Vol. 9, pages 867 and ff (1955).

Still another method for preparing the isothiocyano compounds of formula I comprises reacting an amino compound of formula VII with carbon disulfide and dicyclohexylcarbodiimide in the presence of a tertiary amine according to the procedure set forth by J. C. Jochims, *Chem. Ber.* 101, 1746 (1968).

Compounds of formula I wherein $R_2$ is in the 5- or 6-position of the benzimidazole nucleus are preferred.

Compounds of formula I wherein $n$ is 2 or 3 are preferred, those compounds wherein $n$ is 2 being the most preferred.

The following examples are specific embodiments of this invention.

EXAMPLE 1

1-[2-(5-Phenyl-1,2,4-oxadiazol-3-yl)ethyl]-benzimidazole

A. 1-Cyanoethylbenzimidazole

A solution of 23.6 g (0.2 mole) of benzimidazole, 12.0 g (0.2 mole) of acrylonitrile and 0.3 ml of benzyltrimethylammonium hydroxide (40% in methanol) in 300 ml of dioxane is stirred at room temperature for 30 minutes. The mixture is then kept overnight at room temperature followed by removal of the solvent by distillation in vacuo. The residue is triturated with ether to yield 26.9 g of product, melting point 96°–100°C.

B. 1-Benzimidazole propionamidoxime

A mixture of 25.7 g (0.15 mole) of 1-cyanoethylbenzimidazole, 10.5 g (0.15 mole) of hydroxylamine hydrochloride and 10.4 g (0.08 mole) of potassium carbonate in a solution of 400 ml of ethanol and 50 ml of water is refluxed for 20 hours. The mixture is then cooled and the solvent removed by distillation in vacuo. The resulting solid residue is recrystallized from ethanol to yield 8.9 g of product, melting point 163°–164°C.

C. 1-[2-(5-Phenyl-1,2,4-oxadiazol-3-yl)ethyl]-benzimidazole

To a warm solution of 3.2 g (0.02 mole) of 1-benzimidazolepropionamidoxime in 300 ml of dioxane is added 10 ml of benzoyl chloride. The mixture is stirred for 5 minutes followed by cooling and collection of the precipitate by filtration. This solid is then placed in a 250 ml flask and heated in an oil bath at 173°C for 10 minutes. The resulting brown oil solidifies on cooling and is powdered and dissolved in water. This aqueous solution is made basic with potassium hydroxide, and the resulting which precipitate is collected by filtration to yield 1.0 g of product. Recrystallization from dilute ethanol yields an analytical sample, melting point 112°–114°C.

Anal. Calc'd. for $C_{17}H_{14}N_4O$: C, 70.34; H, 4.86; N, 19.30. Found: C, 70.24; H, 4.77; N, 19.17.

EXAMPLE 2

1-[2-(5-Phenyl-1,2,4oxadiazol-3-yl)ethyl]-2-(4-thiazoyl)benzimidazole

A. 1-Cyanoethyl-2-(4-thiazolyl)benzimidazole

A solution of 10.1 g (0.05 mole) of 2-(4-thiazolyl)-benzimidazole, 2.8 g (0.05 mole) of acrylonitrile and 10 drops of benzyltrimethylammonium hydroxide (40% in methanol) in 200 ml of dioxane is refluxed for 22 hours. At this time, a thin layer chromatography analysis indicates the presence of a large amount of starting material. After adding an additional 1.1 g (0.02 mole) of acrylonitrile and 15 drops of benzyltrimethylammonium hydroxide (40% in methanol), the mixture is refluxed for 2.5 hours. After removal of the solvent by distillation in vacuo, the crude product is isolated in quantitative yield, melting point 129°–134°C.

B. 3-[2-(4-Thiazolyl)-1-benzimidazolyl]propionamidoxime

A solution of 10.0 g (0.04 mole) of 1-cyanoethyl-2-(4-thiazolyl)benzimidazole, 2.7 g (0.04 mole) of hydroxylamine hydrochloride and 2.8 g (0.02 mole) of potassium carbonate in 100 ml of ethanol and 20 ml of water is refluxed for 7 hours. The resulting white precipitate is collected by filtration to yield 8.1 g of product, melting point 206°–206.5°C. Recrystallization from ethanol yields an analytical sample, melting point 206.5°–207°C.

C. 1-[2-(5-Phenyl-1,2,4-oxadiazol-3-yl)ethyl]-2-(4-thiazoyl)benzimidazole

To a warm solution of 3.0 g (0.01 mole) of 3-[2-(4-thiazolyl)-1-benzimidazolyl]propionamidoxime in 400 ml of dioxane is added 15 ml of benzoyl chloride. The mixture is stirred for 5 minutes followed by cooling and collection of the precipitate by filtration. This solid is then placed in a 250 ml flask and heated in an oil bath at 176°C for 40 minutes. The resulting material is dissolved in water and made basic with potassium hydroxide. The solution is extracted with chloroform and the combined chloroform extracts are dried over magnesium sulfate. The magnesium sulfate is removed by filtration and the solvent is removed from the filtrate by distillation in vacuo. The residual oil is allowed to stand in hexane overnight yielding 2.0 g of solid product, melting point 110°–115°C. Recrystallization from hexane yields an analytical sample, melting point 118°–120°C.

Anal. Calc'd. For $C_{20}H_{15}N_5OS$: C, 64.33; H, 4.05; N, 18.76. Found: C, 64.38; H, 4.35; N, 18.48.

EXAMPLE 3

5(and 6)-Nitro-1-[2-(5-phenyl-1,2,4-oxadiazol-3yl)ethyl]-benzimidazole

A. 5(and 6)-Nitro-1-cyanoethylbenzimidazole

Following the procedure of Example 1A, but starting with 24.5 g (0.15 mole) of 5-nitrobenzimidazole, 31.8 g (0.60 mole) of acrylonitrile, and 0.3 ml of benzyltrimethylammonium hydroxide (40% in methanol) in 400 ml of dioxane, 31.1 g of product is obtained.

B. 5 (and 6)-Nitro-1-benzimidazolepropionamidoxime

Following the procedure of Example 1B, but starting with 31.0 g (0.14 mole) of 5(and 6)-nitro-1-cyanoethylbenzimidazole, 10.0 g (0.14 mole) of hydroxylamine hydrochloride and 10.0 g (0.07 mole) of potassium carbonate in a solution of 300 ml of ethanol and 30 ml of water, 29.6 g of product is obtained, melting point 162°–165°C. Recrystallization from ethonal yields an analytical sample, melting point 167°–169°C, with decomposition.

C. 5(and 6)-Nitro-1-[2-(5-phenyl-1,2,4-oxadiazol-3-yl)ethyl]benzimidazole

Following the procedure of Example 1C, but starting with 2.5 g (0.01 mole) of 5(and 6)-nitro-1-benzimidazolepropionamidoxime and 10 ml of benzoyl chloride in 200 ml of dioxane, and isolating and recrystallizing the crude product from acetonitrile yields 0.6 g of product, melting point 206°–214°C.

Anal. Calc'd. for $C_{17}H_{13}N_5O_3$: C, 60.90; H, 3.91; N, 20.89. Found: C, 60.95; H, 4.12; N, 21.11.

EXAMPLE 4

5(and 6)-Amino-1-[2-(5-phenyl-1,2,4-oxadiazol-3-yl)ethyl]-benzimidazole

5(and 6)-Nitro-1-[2-(5-phenyl-1,2,4-oxadiazol-3-yl)ethyl]benzimidazole (0.05 mole) is suspended in 500 ml of absolute ethanol with 2 g of platinum oxide and hydrogenated over a period of 24 hours at 50 p.s.i. The catalyst is removed by filtration and the ethanol is evaporated in vacuo to yield the product.

EXAMPLE 5

5(and 6)-Isothiocyano-1-[2-(5-phenyl-1,2,4-oxadiazol-3-yl)ethyl]benzimidazole

5(and 6)-Amino-1-[2-(5-phenyl-1,2,4-oxadiazol-3-yl)ethyl]benzimidazole (3.05 g) and 1.3 g of calcium carbonate are dissolved in 150 ml of glyme-water (3:1) and cooled to between 0° and 5°C. Thiophosgene (1.5 g) is added dropwise to the solution while stirring rapidly. After the addition is completed the reaction mixture is allowed to warm to room temperature and to stand overnight. The solvent is then evaporated to yield the title compound.

EXAMPLES 6 – 11

Following the procedure of Example 1, but substituting the compound listed in column I below for benzimidazole as a starting material, the compound listed in column II is obtained.

| Example | Column I | Column II |
| --- | --- | --- |
| 6 | 5-ethylbenzimidazole | 5(and 6)-ethyl-1-[2-(5-phenyl-1,2,4-oxadiazol-3-yl)ethyl]benzimidazole |
| 7 | 5-methoxybenzimidazole | 5(and 6)-methoxy-1-[2-(5-phenyl-1,2,4-oxadiazol-3-yl)ethyl]benzimidazole |
| 8 | 5-phenylbenzimidazole | 5(and 6)-phenyl-1-[2-(5-phenyl-1,2,4-oxadiazol-3-yl)ethyl]benzimidazole |
| 9 | 5-chlorobenzimidazole | 5(and 6)-chloro-1-[2-(5-phenyl-1,2,4-oxadiazol-3-yl)ethyl]benzimidazole |
| 10 | 5-bromobenzimidazole | 5(and 6)-bromo-1-[2-(5-phenyl-1,2,4-oxadiazol-3-yl)ethyl]benzimidazole |
| 11 | 5-(trifluoromethyl)benzimidazole | 5(and 6)-(trifluoromethyl)-1-[2-(5-phenyl-1,2,4-oxadiazol-3-yl)ethyl]benzimidazole |

EXAMPLE 12

1-[3-(5-phenyl-1,2,4-oxidiazol-3-yl)propyl]-benzimidazole

A. 1-Cyanopropylbenzimidazole

To a solution of 11.8 g (0.1 mole) of benzimidazole in 200 ml of dioxane is added 4.8 g of sodium hydride (50% dispersion in mineral oil) and the mixture is stirred at room temperature for 2 hours. A solution of 10.3 g (0.1 mole) of 4-chlorobutyronitrile in 100 ml of dioxane is added slowly to the reaction mixture and the mixture is refluxed for 4 hours. After cooling, the solvent is removed in vacuo to give the title compound.

B. 1-Benzimidazolebutyramidoxime

A mixture of 0.1 mole of 1-cyanopropylbenzimidazole, 0.1 mole of hydroxylamine hydrochloride and 0.05 mole of potassium carbonate in a solution of 500 ml of ethanol and 50 ml of water is refluxed for 20 hours. The mixture is then cooled and the solvent removed by distillation in vacuo to yield the title compound.

C. 1-[3-(5-Phenyl-1,2,4-oxadiazol-3-yl)propyl]-benzimidazole

To a warm solution of 0.01 mole of 1-benzimidazolebutyramidoxime in 400 ml of dioxane is added 15 ml of benzoyl chloride. The mixture is stirred for 5 minutes followed by cooling and collection of the precipitate by filtration. The solid is then heated in an oil bath at 175°C for 10 minutes to yield the title compound.

EXAMPLES 13 – 15

Following the procedure of Example 12, but substituting the compound listed in column I below for benzimidazole and the compound listed in column II below for 4-chlorobutyronitrile, the compound listed in column III is obtained.

| Example | Column I | Column II | Column III |
| --- | --- | --- | --- |
| 13 | 5-methylbenzimidazole | 5-chlorovaleronitrile | 5(and 6)-methyl-1-[4-(5-phenyl-1,2,4-oxadiazol-3-yl)butyl]-benzimidazole |
| 14 | 5-chlorobenzimidazole | 6-chlorocapronitrile | 5(and 6)-chloro-1-[5-(5-phenyl-1,2,4-oxadiazol-3-yl)pentyl]-benzimidazole |
| 15 | 5-nitrobenzimidazole | 7-chlorocaprylonitrile | 5(and 6)-nitro-1-[6-(5-phenyl-1,2,4-oxadiazol-3-yl)hexyl]-benzimidazole |

What is claimed is:

1. A compound having the structure

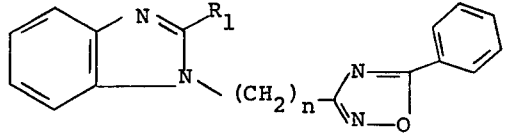

or a pharmaceutically acceptable acid-addition salt thereof wherein $R_1$ is hydrogen or thiazolyl and $n$ is an integer of from 2 to 6.

2. A compound in accordance with claim 1 wherein $R_1$ is hydrogen.

3. A compound in accordance with claim 1 wherein $R_1$ is thiazolyl.

4. A compound in accordance with claim 1 wherein $n$ is 2 or 3.

5. A compound in accordance with claim 4 wherein $n$ is 2.

6. A compound in accordance with claim 1 having the name 1-[2-(5-phenyl-1,2,4-oxadiazol-3-yl)ethyl]-benzimidazole.

7. A compound in accordance with claim 1 having the name 1-[2-(5-phenyl-1,2,4-oxadiazol-3-yl)ethyl]-2-(4-thiazolyl)benzimidazole.

* * * * *